United States Patent [19]

Eastman et al.

[11] Patent Number: 5,646,919
[45] Date of Patent: Jul. 8, 1997

[54] DYNAMIC TRACKING CONTROL IN AN OPTICAL RECORDING SYSTEM BY SENSING MARK FORMATION

[75] Inventors: Clarke K. Eastman, Rochester; Roger A. Hajjar, Fairport, both of N.Y.

[73] Assignee: Eastman Kodak Company, Rochester, N.Y.

[21] Appl. No.: 584,933

[22] Filed: Jan. 16, 1996

[51] Int. Cl.$^6$ .................................................. G11B 7/09
[52] U.S. Cl. ........................... 369/44.26; 369/44.13; 369/44.34; 369/54; 369/44.35
[58] Field of Search .................... 369/44.26, 44.27, 369/44.34, 44.41, 44.13, 44.11, 54, 111, 44.35, 44.36; 250/201.5

[56] References Cited

U.S. PATENT DOCUMENTS

| | | | |
|---|---|---|---|
| 3,673,412 | 6/1972 | Olson | 250/201 |
| 4,232,201 | 11/1980 | Canino | 179/100 |
| 4,308,612 | 12/1981 | Miyauchi et al. | 369/48 |
| 4,322,837 | 3/1982 | Mickleson et al. | 369/44 |
| 4,363,116 | 12/1982 | Kleuters et al. | 369/30 |
| 4,445,209 | 4/1984 | Mickleson et al. | 369/45 |
| 4,449,212 | 5/1984 | Reno | 369/44 |
| 4,458,144 | 7/1984 | Reilly et al. | 250/204 |
| 4,459,690 | 7/1984 | Corsover et al. | 369/44 |
| 4,466,087 | 8/1984 | Cheng | 369/45 |
| 4,481,550 | 11/1984 | Miller et al. | 360/77 |
| 4,599,717 | 7/1986 | Bracht et al. | 369/54 |
| 4,695,994 | 9/1987 | Steenbergen et al. | 369/54 |
| 4,707,816 | 11/1987 | Yonezawa et al. | 369/44 |
| 4,730,294 | 3/1988 | Funada | 369/44.26 |
| 4,807,210 | 2/1989 | Kaku et al. | 369/44.26 |
| 5,033,040 | 7/1991 | Fujita | 369/44.37 |
| 5,105,409 | 4/1992 | Kaku et al. | 369/44.31 |
| 5,105,413 | 4/1992 | Bakx | 369/54 |
| 5,107,107 | 4/1992 | Osborne | 250/231.14 |
| 5,142,514 | 8/1992 | Verboom et al. | 369/30 |
| 5,163,034 | 11/1992 | Kital et al. | 369/44.29 |
| 5,210,662 | 5/1993 | Nishijima | 360/77.04 |
| 5,268,887 | 12/1993 | Honguh et al. | 309/44.13 |
| 5,295,131 | 3/1994 | Ishibashi et al. | 369/275.3 |
| 5,363,360 | 11/1994 | Fairchild | 369/48 |
| 5,434,834 | 7/1995 | Shinoda et al. | 369/44.13 |
| 5,436,880 | 7/1995 | Eastman et al. | 369/54 |
| 5,440,534 | 8/1995 | Eastman et al. | 369/44.27 |
| 5,446,716 | 8/1995 | Eastman et al. | 369/54 |
| 5,508,991 | 4/1996 | Onigata et al. | 369/44.13 |

Primary Examiner—Thang V. Tran
Attorney, Agent, or Firm—Raymond L. Owens

[57] ABSTRACT

An apparatus and method for providing dynamic tracking error detection and control in an optical recording system in which an incident beam records data on a medium in the form of marks. A mark formation effectiveness (MFE) signal is generated by monitoring a reflected write signal and is indicative of a characteristic of the marks formed on the medium. A position signal is generated to provide an indication of cross-track movement of the incident beam relative to a tracking structure on the medium. The tracking structure may be a wobbled groove on an optical disk recording medium. Variations in the MFE and position signals are correlated to provide a dynamic tracking error signal (TES). The MFE and position signal variations may be correlated by, for example, multiplying the two signals together in a multiplier circuit, or using the position signal to control application of the MFE signal to particular inputs of a signal difference circuit. The dynamic TES may be utilized in a servo loop with or without a push-pull signal or other conventional tracking signal.

28 Claims, 8 Drawing Sheets

DYNAMIC TRACKING CONTROL IN AN OPTICAL RECORDING SYSTEM BY SENSING MARK FORMATION

CROSS-REFERENCE TO RELATED APPLICATION

The present invention is related to commonly-assigned and concurrently-filed U.S. patent application Ser. No. 08/586,082 by Roger A. Hajjar et al. entitled "Laser Power Control in an Optical Recording System to Compensate for Variations in Mark Length Resulting from a Wobbled Groove," the disclosure of which is incorporated herein by reference.

FIELD OF THE INVENTION

The present invention relates to optical data recording. More particularly, the present invention relates to utilizing a signal generated during recording and indicative of mark formation to control the position of a recording spot relative to a tracking structure on a recording medium.

BACKGROUND OF THE INVENTION

In optical data recording, an optical source, typically a laser or laser diode, generates an incident write signal in the form of a radiation beam. The beam is applied to an optical medium to record data thereon as optically-detectable marks. To facilitate proper application of the beam to the medium, certain types of media, such as compact disk recordable (CD-R) media, include a preformed spiral tracking structure typically referred to as a groove or pregroove. The spiral groove may be "wobbled" in a radial direction of the disk about an average groove centerline in order to provide rotational velocity and beam position information in a well-known manner. The dimensions and shape of the groove can vary depending upon the medium, but an exemplary groove width is on the order of 0.4 μm in the radial direction, with adjacent grooves in the spiral separated by about 1.6 μm in the radial direction. In CD-R media, the Groove corresponds to a data track on which marks are recorded.

The quality of recorded data in many optical recording systems is generally very sensitive to the cross-track position of the recording spot on the medium. In a CD-R system, for example, data quality rapidly deteriorates when the recording spot deviates from the centerline of the disk groove. A commonly-used technique for maintaining a recording spot on-track is referred to as push-pull tracking. The technique involves deriving a push-pull tracking signal from an interference pattern caused by the interaction of the recording spot with the Groove or other suitable tracking structure on the recording medium. A tracking servo adjusts the position of the recording spot to keep the push-pull signal at a predetermined optimum value Generally referred to as a "tracking offset" or an on-track value. The tracking offset is intended to compensate for static errors such as detector misalignment and optical axis tilt. Prior art techniques typically determine the tracking offset during a calibration period before data recording. One common approach is to make a series of trial recordings.

U.S. Pat. No. 5,440,534, assigned to the present assignee and incorporated by reference herein, discloses a technique for determining the tracking offset in an optical recorder by correlating a mark formation signal generated during one or more trial recordings with a corresponding push-pull tracking signal. This technique recognizes and makes use of the fact that certain characteristics of the mark formation signal vary with cross-track position of the recording spot, thereby providing a number of advantages over other techniques. For example, the tracking offset can be determined in a single recording pass, as compared to separate record and read passes required by two-pass techniques. In addition, the resulting tracking offset is optimized for recording rather than for reading.

These and other push-pull tracking techniques are generally "single spot" techniques in that the spot that records and reads data also generates the tracking signal. This reduces system cost and complexity when compared with multi-spot tracking techniques. However, push-pull tracking also suffers from a number of problems. For example, the tracking offset can vary with conditions such as media tilt, lens decenter, optical spot aberrations, and groove asymmetry. These conditions can change from disk to disk and from point to point on a given disk. The tracking offset determined during a calibration period may therefore be unable to keep the recording beam sufficiently on-track in the presence of the changing conditions that can arise during actual data recording.

As is apparent from the above, a need exists for a dynamic tracking technique in which a recording beam is maintained on-track using tracking offset information generated during actual data recording.

SUMMARY OF THE INVENTION

The present invention generates a tracking error signal (TES) during actual data recording by correlating a mark formation effectiveness (MFE) signal with a position signal indicative of relative cross-track movement between a recording spot and a tracking structure on a recording medium. The TES is used by a tracking servo in an optical recording system to keep the recording spot on-track. The tracking servo may use the TES of the present invention either alone or in conjunction with a conventional tracking signal such as a push-pull signal. The MFE signal corresponds to a monitored characteristic of a reflected optical recording beam, and provides an indication of whether marks have been properly formed on the medium. The present invention is applicable to any optical recording medium in which an MFE signal generated during recording varies with the cross-track position of the recording spot.

In accordance with one aspect of the invention, an apparatus is provided for use in an optical recording system in which an incident beam records data on a medium in the form of marks. An MFE signal is generated by monitoring a reflected write signal and is indicative of a characteristic of the marks formed on the medium. A position signal is generated to provide an indication of a cross-track movement of the incident beam relative to a tracking structure such as a wobbled groove on an optical disk recording medium. Variations in the MFE and position signals are then correlated to provide a dynamic TES. The MFE and position signals are first band pass filtered and then correlated by, for example, using a multiplier circuit to multiply the two signals together, or using the position signal to control application of the MFE signal to particular inputs of a signal difference circuit.

The position signal in accordance with the invention can be generated using a number of different techniques. The position signal is generally indicative of relative cross-track motion between the incident beam recording spot and a desired on-track position which may correspond to, for example, a centerline of a tracking structure on the medium.

The relative cross-track motion can be provided by, for example, moving the recording spot in a predetermined cross-track pattern using a drive signal applied to a tracking actuator. In such an embodiment, the position signal may correspond to the drive signal applied to move the actuator or to a detected push-pull signal indicative of the motion of the recording spot. Alternatively, relative cross-track motion of the tracking structure beneath the recording spot can be detected to provide a position signal. This type of relative cross-track motion may be provided by the wobbled groove tracking structure of a recordable compact disk (CD-R) medium. The present invention provides a dynamic TES using an MFE signal measured during actual data recording and a position signal corresponding to, for example, the time-varying AC component of a detected push-pull position signal. Offset errors of the prior art associated with the DC component of the push-pull signal are thereby avoided. This provides improved correction for static errors such as detector misalignment or optical axis tilt. In addition, the TES of the present invention adapts more accurately than prior art push-pull signals to changing conditions such as media tilt, lens decenter, optical spot aberrations, and groove asymmetry. Furthermore, the dynamic tracking of the present invention does not require generation of an offset value or set of offset values during a calibration period.

Further features of the invention, its nature and various advantages will become more apparent from the accompanying drawings and following detailed description of the invention.

DETAILED DESCRIPTION OF THE PREFERRED EMBODIMENTS

Figure 1:
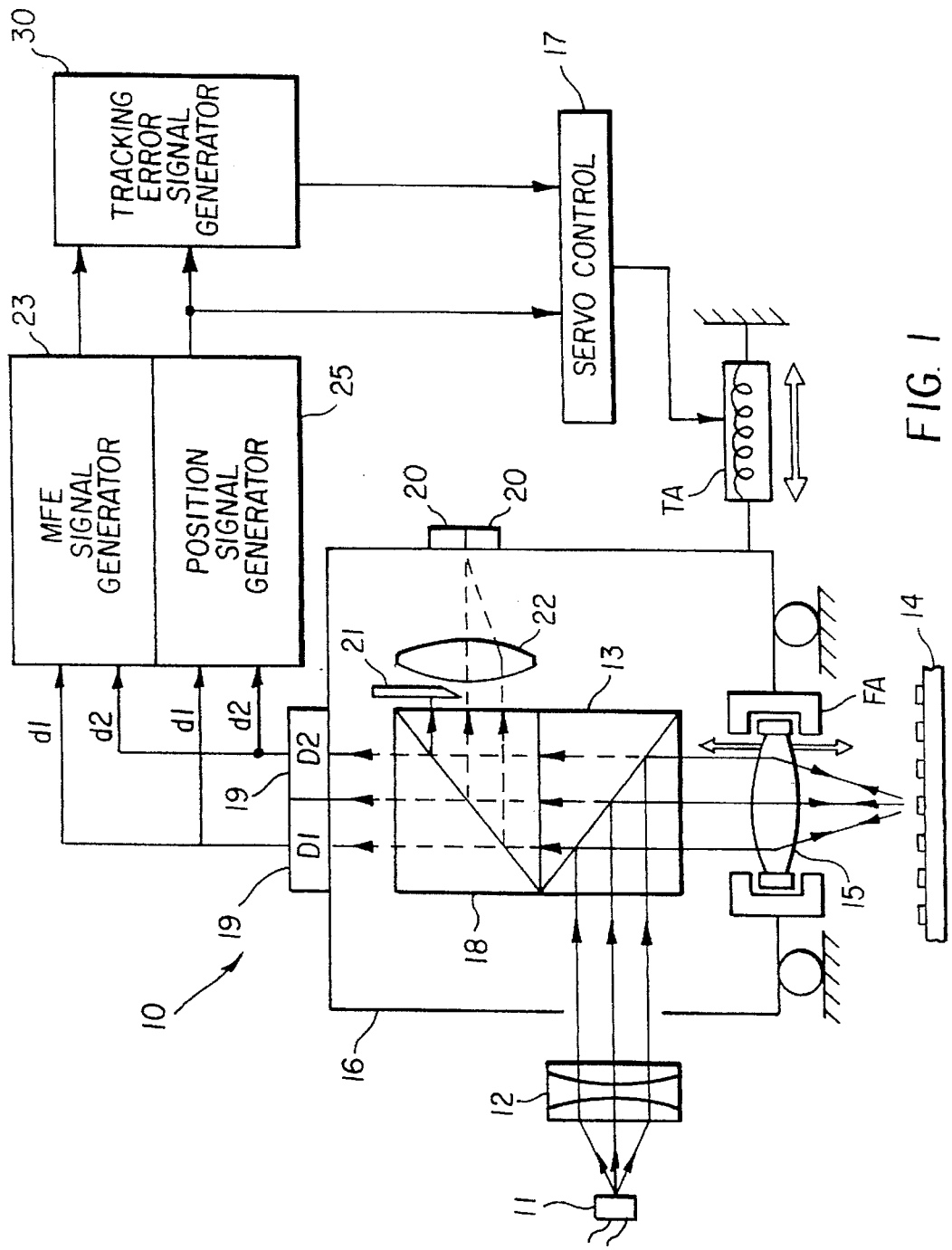
FIG. 1 is a block diagram of an optical recording system in which the dynamic tracking control of the present invention may be implemented.

FIG. 1 shows an optical recording system 10 in accordance with the invention. The recording system 10 includes an optical source 11 for generating an incident optical write signal. The optical source 11 may be, for example, a laser, laser diode or LED. The optical source 11 is intensity-modulated by a stream of recording data, such as digital audio, video or other information, suitably encoded to facilitate recording on the optical medium. A data source (not shown) supplies the encoded recording data, generally in the form of a stream of pulses, to optical source 11. An exemplary data encoding technique well-known in the art is the eight-to-fourteen bit modulation (EFM) code typically used in CD-R recording. The incident optical signal typically includes a series of incident write pulses, each corresponding to a portion of the recording data.

The incident optical signal passes through beam shaping optics 12 and is reflected by a beam-directing surface of beam splitter 13 toward an optical recording medium 14. Although particularly well-suited for tracking on a CD-R disk with a wobbled groove, the invention is more broadly applicable to any recordable medium which includes an optically-detectable tracking structure. The term "wobbled groove" as used herein should therefore be understood to include any optically-detectable structures arranged on a surface of a medium and suitable for generating relative cross-track motion in accordance with the invention.

The incident beam is applied to medium 14 via an objective lens 15 mounted on a focus actuator FA. Focus actuator FA is designed to move objective lens 15 in a direction perpendicular to the surface of medium 14 in order to change the focus of the recording spot on the medium. A tracking actuator TA is operative to move those parts of the system which are within or part of a housing 16, such as the objective lens 15, beam splitters 13, 18, and photodetector assemblies 19, 20, in response to a control signal from a servo control system 17. Tracking actuator TA thereby moves the incident recording beam laterally across medium 14 in order to maintain the beam in an on-track position with respect to the tracking structure of medium 14. Alternatively, the tracking function may be accomplished by moving only objective lens 15 in a lateral direction. Tracking and focus actuators TA and FA may include, for example, various well-known arrangements of coils and electro-magnets (not shown) controlled by servo control system 17 in a conventional manner. The servo control system 17 operates the tracking actuator in response to the dynamic tracking error signal (TES) of the present invention generated in a manner to be described in greater detail below. The servo control system 17 may also receive a conventional push-pull tracking signal directly from a position signal generator 25 as shown in FIG. 1. In such an embodiment, the tracking servo utilizes both the dynamic TES of the present invention and a conventional push-pull tracking signal.

A return beam reflected and diffracted from the recording medium 14 passes through the lens 15 and the first beam splitter 13 and is applied to a second beam splitter 18. The return beam is separated by beam splitter 18 into two components. A first component is applied to a detector array 19 which includes first and second detector elements D1 and D2. The detector elements D1 and D2 generate first and second detected signals d1 and d2, respectively. The second component of the return beam is directed to a focus photodetector assembly 20 via a collimating lens 22 and a limiting aperture 21. The focus photodetector assembly 20 is used to generate a focus error signal for controlling the position of the objective lens 15. As an alternative, a focus error signal could be generated using the detected signals from detector array 19.

The first and second detected signals d1 and d2 are applied to a mark formation effectiveness (MFE) Signal generator 23 and position signal generator 25. The signals d1 and d2 track the intensity modulation of the reflected optical write signal, and may be combined to provide a reflected write signal. Systems which monitor a reflected write signal are often referred to as direct-read-during-write (DRDW) systems. The reflected write signal can be processed to generate an MFE signal in the manner described in U.S. patent application Ser. No. 08/179,472, which is assigned to the assignee of the present invention and incorporated by reference herein. The term "reflected write signal" as used herein will generally refer to a combined electrical signal from detector array 19, rather than the optical signal incident on the detector array. The reflected write signal includes at least one reflected write pulse, corresponding to an incident pulse in the incident optical write signal. Additional detail regarding use of MFE signals in servo loops can be found in U.S. Pat. No. 5,436,880 and U.S. Pat. No. 5,446,716, both of which are assigned to the assignee of the present invention, and incorporated hereinby reference.

The MFE signal generator 23 in this embodiment receives signals d1 and d2 from detector array 19, combines d1 and d2 to form a reflected write signal, and generates an MFE signal indicative of some aspect of mark formation quality such as the resulting mark length. An exemplary MFE signal generator described in the above-cited U.S. patent application Ser. No. 08/179,472 generates an MFE signal as an estimate of the reflected write pulse normalized amplitude rate of change. The term "amplitude rate of change" refers generally to the change in reflected write pulse voltage, current or power as a function of time. The term "decay rate" refers to a particular type of amplitude rate of change, characteristic of "burn-dark" optical media such as CD-R, in which the reflected write pulse amplitude decays from an initial peak value to a steady-state plateau value during mark formation. It should be noted that the reflected pulse amplitude rate of change is only one type of reflected signal characteristic which may be used as an MFE signal to provide dynamic tracking in accordance with the present invention. These and other MFE signals will be described in greater detail below in conjunction with FIGS. 5(a)–5(d).

The position signal generator 25 receives detected signals d1 and d2 from detector array 19 and generates a conventional push-pull signal therefrom. In an alternative embodiment in a system utilizing a wobbled-groove medium, the position signal generator output may also be sent to an absolute-time-in-pregroove (ATIP) detection circuit (not shown). Other alternative embodiments of the invention may utilize a position signal generator that does not receive detected signals d1 and d2 and instead generates a signal suitable for driving a tracking actuator to thereby provide relative cross-track motion.

The present invention utilizes a relative cross-track position signal and an MFE signal to provide dynamic tracking error detection and tracking position control in the optical recording system of FIG. 1. The cross-track position signal is generated by providing relative cross-track motion between the recording spot and the tracking structure of the recording medium. A tracking error signal is then generated by detecting the resulting variations in the MFE signal, and correlating the MFE signal variations to variations in the position signal.

Figure 2A:
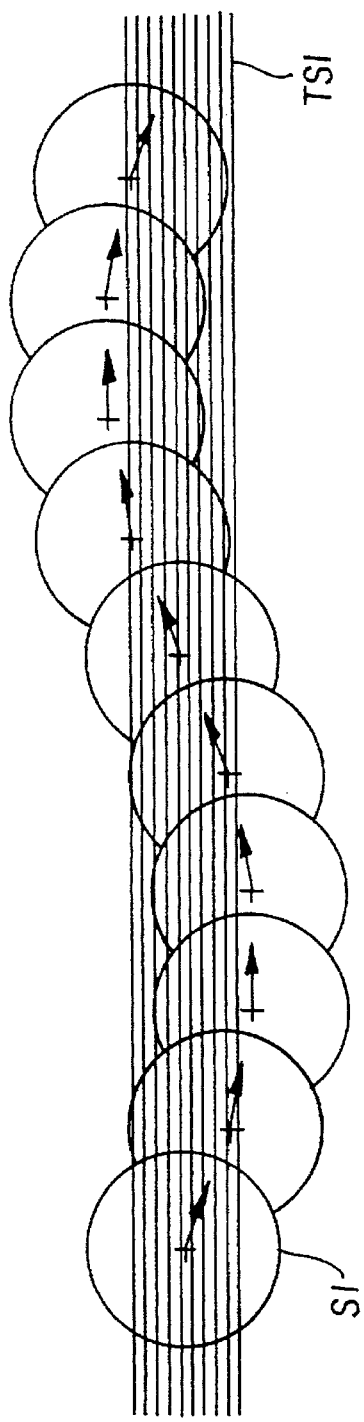
FIG. 2(a) illustrates cross-track motion of a recording spot relative to a non-wobbled tracking structure of a recording medium.
Figure 2B:
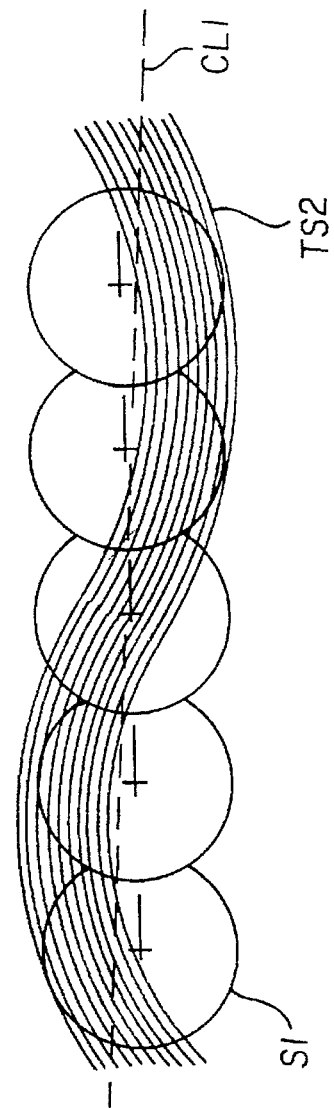
FIG. 2(b) illustrates a cross-track motion of a wobbled groove tracking structure relative to a recording spot.

FIGS. 2(a) and 2(b) illustrate two exemplary techniques for generating the cross-track position signal of the present invention. The views shown are looking down on an optical disk in a direction normal to its laser-incident surface. In FIG. 2(a), a recording spot S1 is focused on a non-wobbled tracking structure TS1. The spot S1 typically has a width of greater than 0.5 μm and less than 2.0 μm, but can of course vary depending upon the application. The tracking structure shown may correspond to a pre-formed groove in which marks are recorded during the recording process. A disk which includes the data track corresponding to tracking structure TS1 is rotated past the stationary recording beam at a desired velocity, such that S1 moves relative to the disk. Movement of spot S1 back and forth across the tracking structure TS2 is shown in FIG. 2(a) as a series of subsequent overlapping spots. An arrow in the center of each spot indicates the direction of movement of the recording beam relative to the recording medium. This relative cross-track motion could be provided by, for example, supplying an appropriate drive signal to the tracking actuator in the system of FIG. 1. In such an embodiment, the position signal can therefore be obtained from tracking actuator drive circuitry acting as a position signal generator. Although the cross-track motion of the recording spot shown in FIG. 2(a) is substantially sinusoidal, it should be noted that the present invention may utilize any of a number of other repetitive patterns to provide suitable cross-track motion.

FIG. 2(b) illustrates generation of relative cross-track motion by variation in the tracking structure relative to a focused recording spot. The recording spot S1 is focused on tracking structure TS2 which in this example corresponds to a wobbled groove. As in FIG. 2(a), the movement of spot S1 relative to TS2 is indicated by a series of subsequent overlapping spots, and each overlapping spot has an arrow in its center indicating the direction of movement of the recording beam relative to the medium. In this example, the groove wobble provides relative cross-track movement between the spot and the tracking structure. Again, although a wobbled groove tracking structure is usually substantially sinusoidal as shown in FIG. 2(b), other repetitive variations in the tracking structure could be used to provide the desired relative cross-track motion.

The wobbled groove tracking structure will now be described in greater detail. As noted above, CD-R media typically include a wobbled groove such as that shown in FIG. 2(b). The wobbled groove corresponds to a data track on which marks are intended to be recorded. The dimensions and shape of the groove can vary depending upon the medium, but a typical groove width is on the order of 0.4 μm in the radial direction of the disk, with adjacent grooves in the spiral separated by about 1.6 μm in the radial direction. It should be noted that the amount of groove wobble is exaggerated in FIG. 2(b) for illustrative purposes. The deviation of the wobbled groove from a groove centerline CL1 is referred to as the wobble amplitude. The wobble amplitude for CD-R media is typically on the order of 60 nm peak-to-peak, and the average spatial wavelength of the groove is on the order of 60 μm.

The groove wobble is generally used to provide rotational velocity and beam position information. When a wobbled-groove disk is rotated at, for example, a constant linear velocity of 1.4 meters/second, the wobble amplitude variation will modulate a push-pull tracking signal at a predetermined frequency. For CD-R media in systems operating at a write speed of 1X or 4.32 Mbits/sec, the wobble frequency is 22.05 kHz. The wobble frequency is scaled upward for systems operating at higher speeds such that, for example, a system operating at a 6X write speed will have a wobble frequency six times higher than that of a 1X system, or 132.30 kHz. A servo loop can then provide the desired disk rotational velocity by controlling the disk motor to maintain the tracking signal modulation at the wobble frequency.

The beam position on the surface of a wobbled-groove disk is provided by frequency-modulating the wobble. The modulation of the push-pull signal will then vary about the wobble frequency in accordance with the frequency modulation applied thereto. In CD-R systems, the frequency modulation of the groove wobble may be, for example, on the order of plus and minus five percent. The information frequency-modulated onto the groove wobble is often referred to as absolute-time-in-pregroove (ATIP) information. The ATIP information typically includes binary data indicating the amount of time the beam would have spent in the spiral groove to reach a given position on the disk surface by following the groove from its beginning at the inner disk diameter. The time may be represented in minutes, seconds and frames, with a frame corresponding to, for example, 1/75 of a second at a write speed of 1X. The ATIP modulation may also include other information such as a disk identifier, synchronization marks and the expected optimum recording power. ATIP is described in greater detail in U.S. Pat. No. 5,363,360, which is assigned to the present assignee and incorporated herein by reference.

When the tracking structure varies relative to the spot, as in the wobbled groove example of FIG. 2(b), the relative cross-track motion is detected to provide a position signal. CD-R systems typically detect the groove wobble and any modulation thereon using a technique similar to that used to provide a conventional push-pull tracking signal. The resulting detected signal may be an ATIP wobble signal used to provide rotational velocity control and beam position information as described above. It should be noted that both ATIP detection and the dynamic tracking of the present invention generally utilize the time-varying component of the detected groove wobble, hereinafter referred to as the AC component. Information on the absolute position of the tracking structure relative to the recording spot is usually not needed and, in view of the tracking offset problems described previously, may be unreliable under certain system operating conditions.

Figure 3:
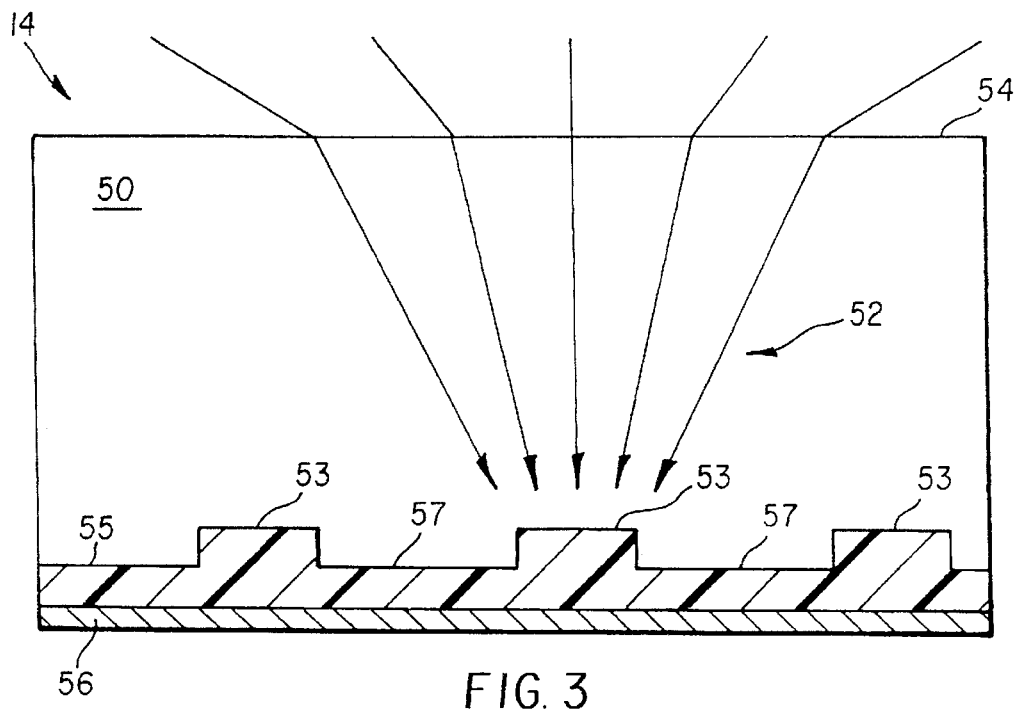
FIG. 3 is a side sectional view of a groove structure of a recordable compact disk (CD-R) medium.

FIG. 3 illustrates a partial side sectional view of an exemplary CD-R medium 14. The medium 14 includes a transparent polycarbonate substrate 50 having an upper surface 54. A recording beam 52 is incident on the surface 54 of the substrate 50 and is focused onto a groove 53. Substrate 50 overlies an absorptive dye recording layer 55 and a gold reflective layer 56. As noted above, data is recorded in the dye layer 55 by beam 52 in the form of optically-detectable marks within groove 53. The gold reflective layer 56 provides the high reflectivity required for reading back the recorded data. It can be seen from FIG. 3 that the dye layer 55 is thicker in the grooves 53 than it is in the areas 57 between the grooves. This is one factor which can produce detectable variations in an MFE signal at a constant write power level as the recording beam moves from an on-track to an off-track position.

Figure 4:
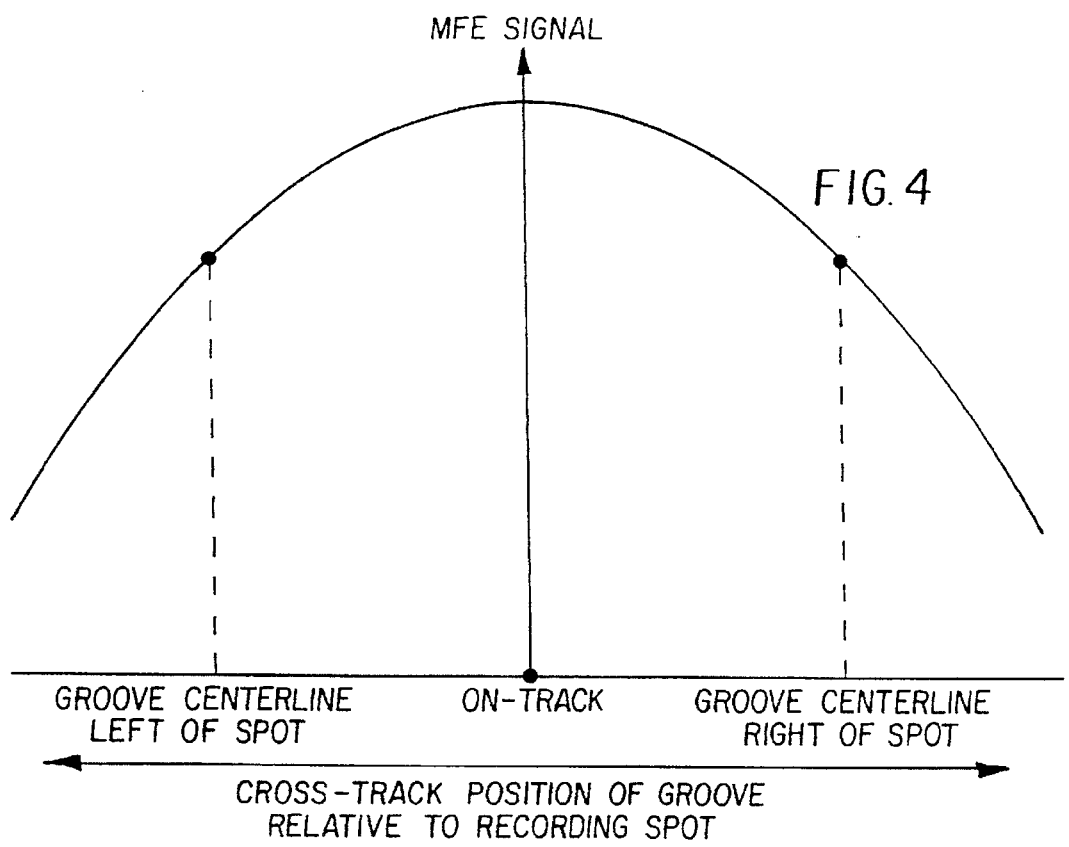
FIG. 4 is a plot of mark formation effectiveness (MFE) signal variations during recording as a function of the cross-track position of the groove relative to the recording spot.

FIG. 4 is a plot of MFE signal variation during recording as a function of the cross-track position of the groove relative to the recording spot. It can be seen that the MFE signal during recording is at a maximum when the recording beam spot is on-track, that is, centered on the wobbled groove. As the beam moves off-track to either side of the groove centerline, the MFE signal decreases in magnitude as shown. The present invention utilizes these MFE signal variations to provide a dynamic tracking error signal in a manner to be described below.

Figure 5A:
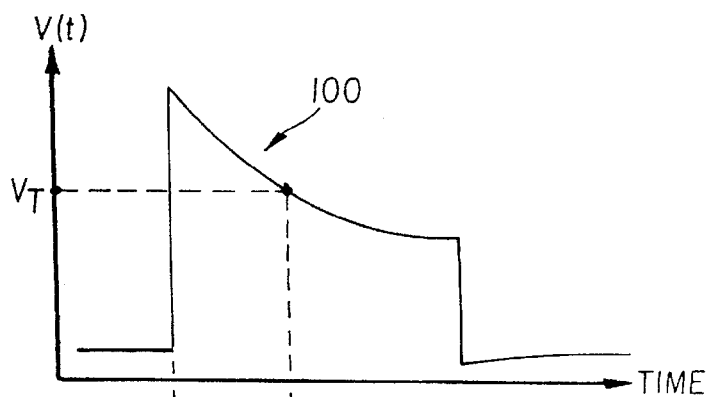
FIGS. 5(a)–5(d) illustrate exemplary MFE signals that may be used to generate a tracking signal in accordance with the present invention.
Figure 5B:
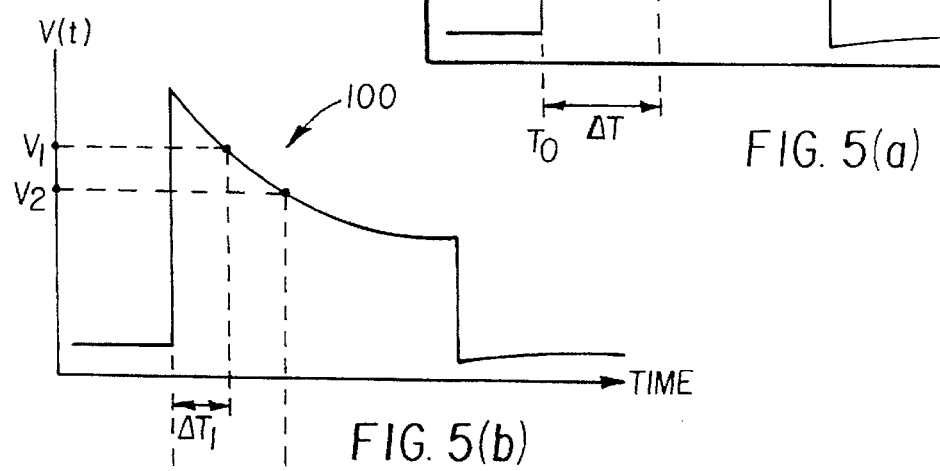
Figure 5C:
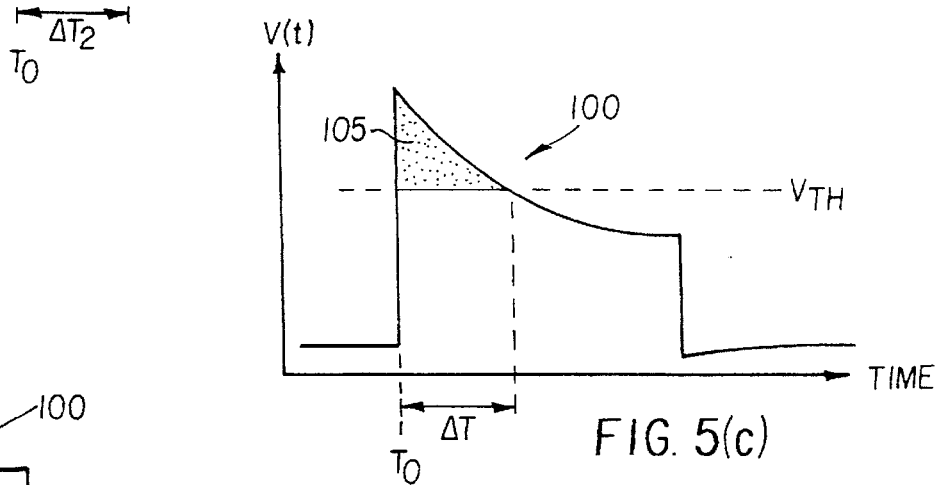
Figure 5D:
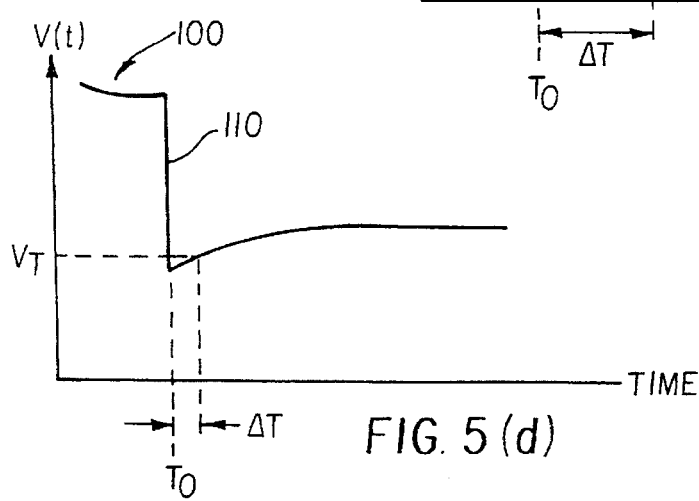

FIGS. 5(a)–5(d) illustrate exemplary MFE signals suitable for use with the present invention. Additional detail on MFE signals and MFE signal generation may be found in the above-cited U.S. patent application Ser. No. 08/179,472. The MFE signals are each illustrated using a single reflected write pulse 100 shown as a function of time. The reflected write pulse 100 is part of a reflected write signal shown in these examples as a voltage waveform V(t) and may represent, for example, one of the electrical signals d1 or d2 from the detector array 19 of FIG. 1, or the sum of signals d1 and d2. The pulse 100 has a rising edge at time $T_0$. FIG. 5(a) shows generation of an MFE signal by sampling the reflected write pulse 100 at a time $\Delta T$ after the pulse rising edge. The resulting sampled voltage $V_T$ may be used to provide an MFE signal such as, for example, the quotient $1/V_T$, which would be at a maximum value when the recording beam is on-track in accordance with the characteristic of FIG. 4. FIG. 5(b) shows that an alternative MFE signal can be generated by sampling the reflected write pulse at two predetermined times $\Delta T1$ and $\Delta T2$ after the write pulse rising edge. The MFE signal may then be provided as, for example, the quotient $V_1/V_2$. FIG. 5(c) shows that another alternative MFE signal can be derived from the integral of the reflected write pulse 100 over the time $\Delta T$ that the pulse exceeds a threshold value $V_{TH}$. The MFE signal corresponds to the value of the integrated area 105. FIG. 5(d) shows that another alternative MFE signal can be derived by sampling the reflected write signal at a time $\Delta T$ after the falling edge 110 of the reflected write pulse 100. This type of MFE signal is often referred to as a direct-read-after-write (DRAW) signal. The multiple sample and integration techniques of FIGS. 5(b) and 5(c), respectively, could also be applied to the waveform following the reflected pulse falling edge shown in FIG. 5(d). The term "MFE signal" as used herein should be understood to include any reflected write signal characteristic, or an estimate or transformation thereof, which can be monitored to provide an indication of whether a mark or marks have been properly formed on the medium. MFE signals in accordance with the invention thus include both DRDW and DRAW signals.

Figure 6:
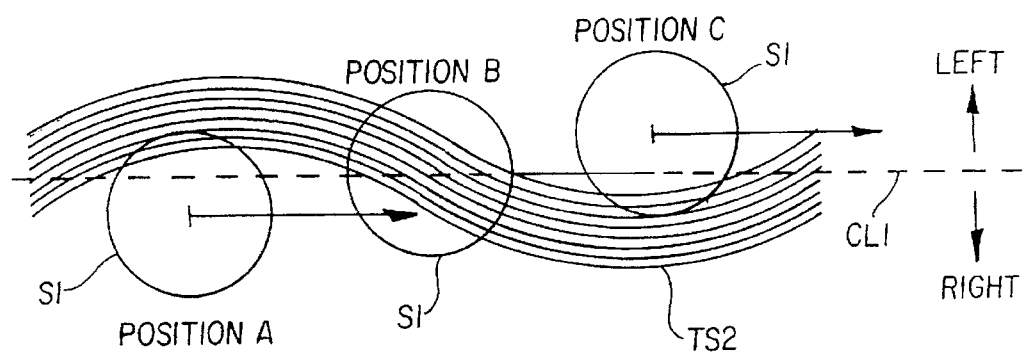
FIG. 6 illustrates three exemplary sample recording spot positions relative to a wobbled groove of a CD-R medium.

FIGS. 6, 7, 8(a) and 8(b) illustrate the operation of an exemplary embodiment of the present invention in which relative cross-track motion is provided by a wobbled groove of a CD-R medium. FIG. 6 shows a portion of the wobbled groove tracking structure TS2 with recording spot S1 in three different positions A, B and C relative to groove centerline CL1. In position A, the groove centerline CL1 is to the left of the recording spot S1. In position B, the spot is centered on the groove centerline CL1 and will generally track along CL1 since the wobble frequency is too high for the recording spot to follow instantaneously. In position C, CL1 is to the right of the spot.

Figure 7:
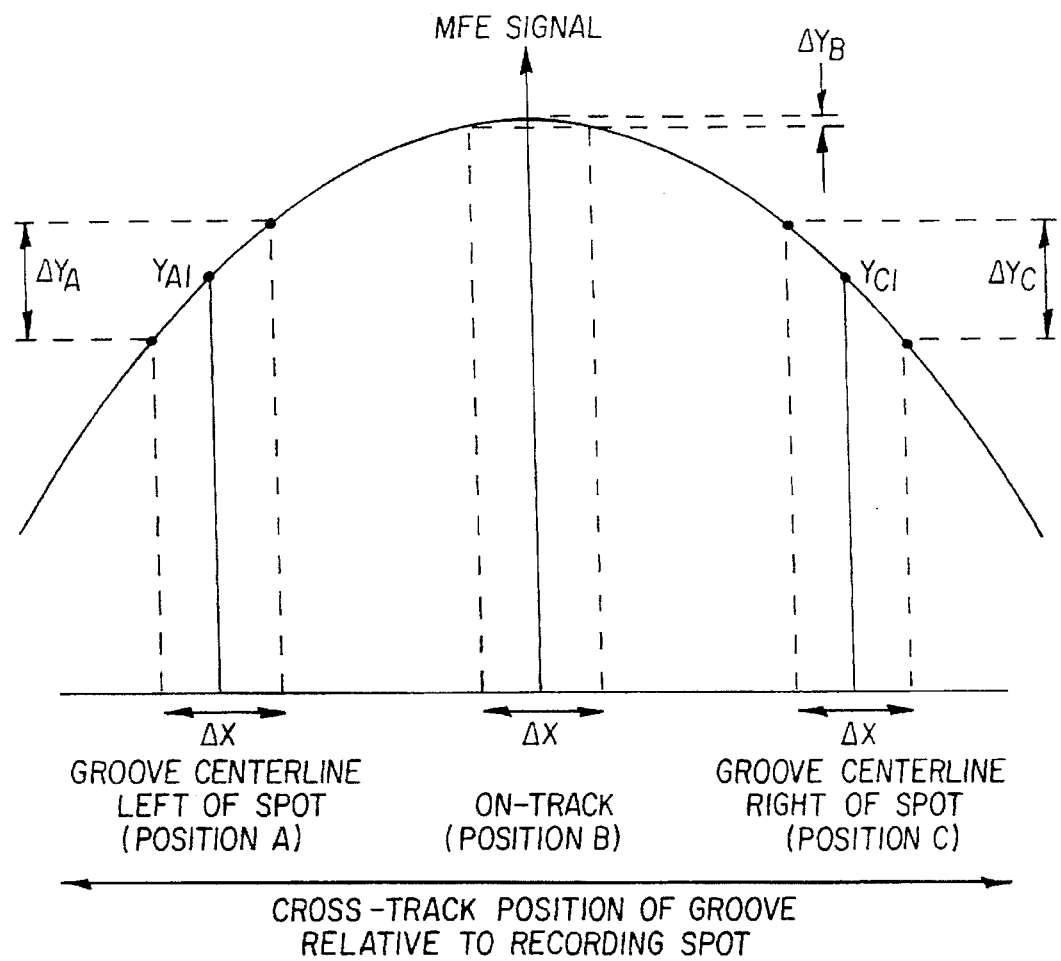
FIG. 7 is a plot of MFE signal variations during recording for the three different recording spot positions shown in FIG. 6.

FIG. 7 is a plot of the resulting MFE signal variations for each of the recording spot positions A, B and C of FIG. 6. The relative cross-track motion for each of the spot positions is provided by the wobbled groove and is shown as $\Delta X$ on the horizontal axis. In this embodiment, the position signal corresponds to the detected groove motion at the wobble frequency and is generally the same for each of the three spot positions A, B and C. The corresponding MFE signal variations, however, are different for each spot position and are shown as $\Delta Y_A$, $\Delta Y_B$ and $\Delta Y_C$ for the spot positions A, B and C, respectively. The present invention utilizes these differences in MFE signal variation to provide a dynamic tracking error signal (TES).

Figure 8A:
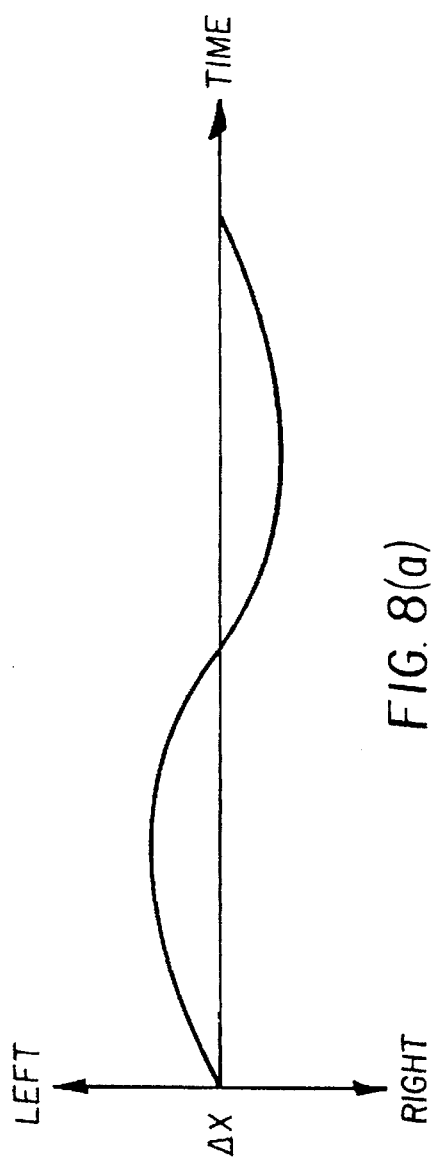
FIGS. 8(a) and 8(b) show plots of relative cross-track motion and MFE signal variations, respectively.
Figure 8B:
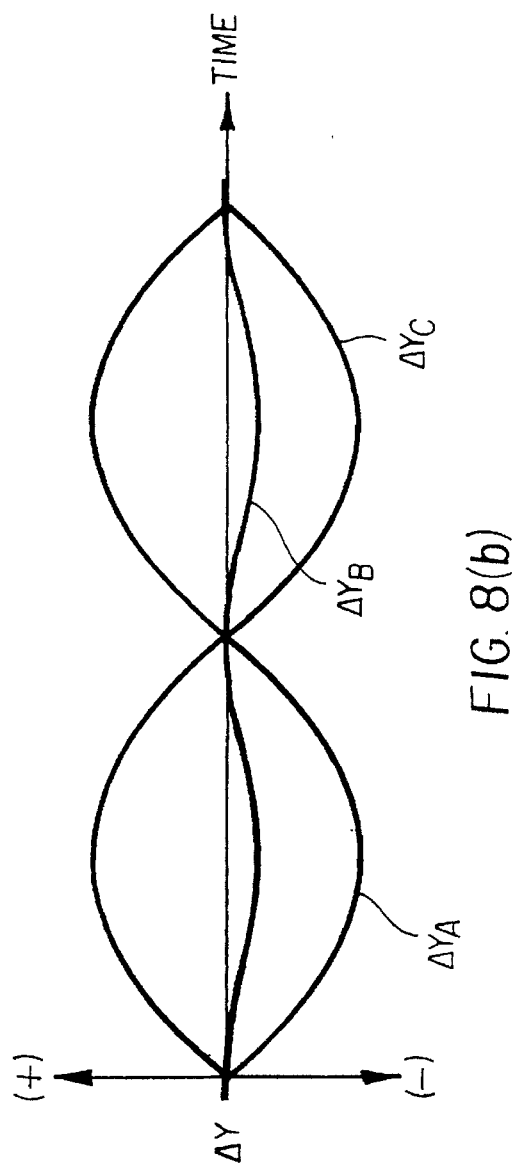

FIGS. 8(a) and 8(b) show in greater detail the position signal variation $\Delta X$ and MFE signal variation $\Delta Y$, respectively, for each of the spot positions A, B and C of FIG. 6 over one cycle of the groove wobble. The MFE signals variations $\Delta Y_A$ and $\Delta Y_C$ are measured relative to MFE signal values $Y_{A1}$ and $Y_{C1}$, respectively, as shown in FIG. 7, which are the MFE values for positions A and C, respectively, when the position signal ΔX is at its average value corresponding to the groove centerline. For spot position B, which corresponds to the desired on-track position, the MFE signal variation $\Delta Y_B$ is the same when the groove moves to the left relative to the spot as it is when the groove moves to the right relative to the spot. For spot position A, the MFE signal variation $\Delta Y_A$ is negative when the groove moves to the left (farther from the spot) and positive when the groove moves to the right (closer to the spot). For spot position C, the MFE signal variation $\Delta Y_C$ is positive when the groove moves to the left and negative when the groove moves to the right. The present invention correlates the position signal variations ΔX, in this embodiment representing the movement of the groove relative to the recording spot, with the MFE signal variations ΔY. The correlation of ΔX and ΔY provides a dynamic TES which can be used to maintain the recording spot on-track relative to the groove centerline.

Figure 9:
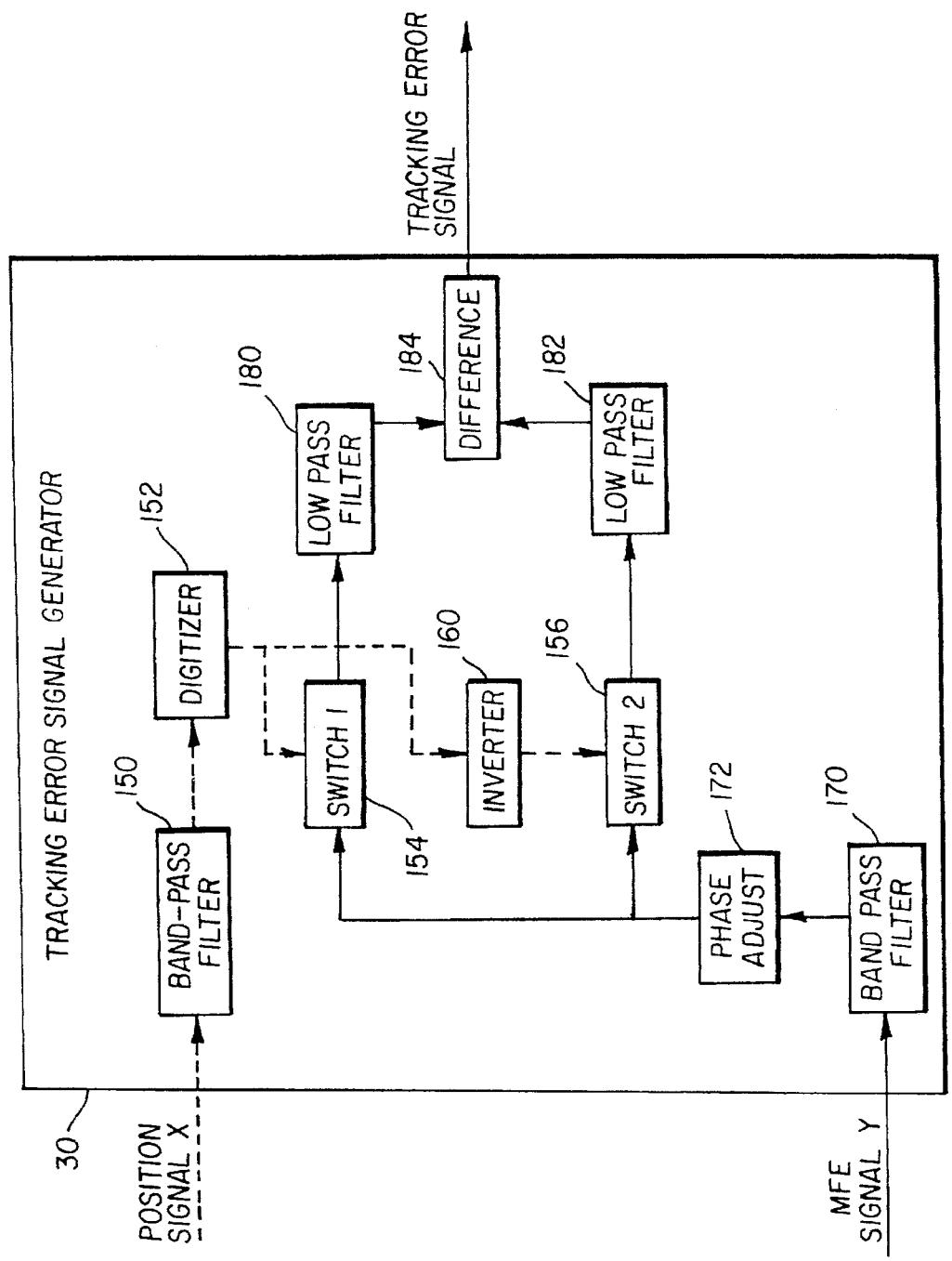
FIG. 9 is a block diagram of an exemplary tracking error signal (TES) generator in accordance with the present invention.

FIG. 9 is an exemplary embodiment of a TES generator 30 which implements the correlation of position signal variations ΔX and MFE signal variations ΔY. The position signal X is supplied from position signal generator 25 of FIG. 1 and may be, for example, a conventional push-pull signal. Alternatively, the position signal X may correspond to an actuator drive signal generated by a tracking servo for application to a tracking actuator. The position signal X is filtered in band pass filter (BPF) 150 and then digitized in digitizer 152. For a CD-R system, the BPF 150 may be centered at the fundamental groove wobble frequency and may have a passband suitable for passing any FM modulation of the wobble frequency. The position signal after digitization may be, for example, a binary signal having a logic level "1" when the wobbled groove has moved to the left of the centerline and a logic level "0" when the wobbled groove has moved to the right of the centerline. The digitized position signal operates switch 154 and an inverted version of the digitized position signal from inverter 160 operates switch 156.

The MFE signal Y is supplied to a second BPF 170 and thereafter to a phase adjust element 172. The BPFs 150 and 170 serve to AC couple the position and MFE signals, respectively, to the TES generator 30 such that only the AC components thereof, representing instantaneous deviations of these signals from their average values, are processed. BPFs 150, 170 also eliminate unwanted noise outside the bandwidth of interest. In addition, because filters often cause a significant time delay, applying similar filtering to both the position and MFE signals helps to keep them in phase. BPF 170 may therefore also be centered at the groove wobble frequency and have a passband suitable for passing any modulation thereon. Phase adjust element 172 is used to compensate for any remaining phase difference between the filtered position and MFE signals.

The digitized position signal controls switches 154 and 156 to gate the MFE signal. Switch 154 is closed and switch 156 is open when the digitized position signal is at a logic "1" level. Switch 154 is open and switch 156 is closed when the digitized position signal is at a logic "0" level. Low pass filters 180, 182 connected in the signal path after switches 154, 156 serve to average out the MFE signal Y over several gating cycles. Suitable cut-off frequencies for low pass filters 180, 182 depend, for example, on the recording speed and the highest frequency at which the tracking actuator (TA in FIG. 1) can be driven. Typical cut-off frequencies at 1X would be in the range of about 40 Hz to 4 kHz, but it should be understood that cut-off frequencies need not be limited to this range. The resulting filtered MFE signals are subtracted in a difference circuit 184 which may be a differential amplifier. If the resulting difference is zero, the recording beam is on-track relative to the groove centerline. If the difference is non-zero, its sign indicates whether the recording beam is off-track to the right or to the left. The magnitude of the difference increases as the recording beam moves farther off-track in either direction. The output of difference circuit 184 thus represents a dynamic TES which can be utilized in a conventional tracking servo control system to adjust a tracking actuator to keep the recording beam on-track.

It should be noted that the dynamic TES of the present invention may be utilized in conjunction with a conventional push-pull tracking signal. For example, both the dynamic TES from TES generator 30 and a push-pull signal from position signal generator 25 could be applied to a servo control system as shown in FIG. 1. This would allow the servo to utilize desired properties of both signals. For example, although the push-pull signal generally has an unreliable DC content, its AC content is more reliable and extends to relatively high frequencies. The dynamic TES of the present invention exhibits reliable DC and AC content, but the upper end of its AC frequency range may be limited by filters such as low pass filters 180, 182 in the TES generator 30 of FIG. 9. One possible technique for combining the dynamic TES of the present invention with a conventional push-pull signal is to use the dynamic TES to update the tracking offset value of the push-pull signal. This could be accomplished by, for example, integrating the dynamic TES, multiplying the integral by a predetermined scaling factor, and then adding the result to the previously-determined push-pull offset value. Numerous alternative approaches may be used to combine the dynamic TES of the present invention with push-pull or other conventional tracking signals.

Figure 10:
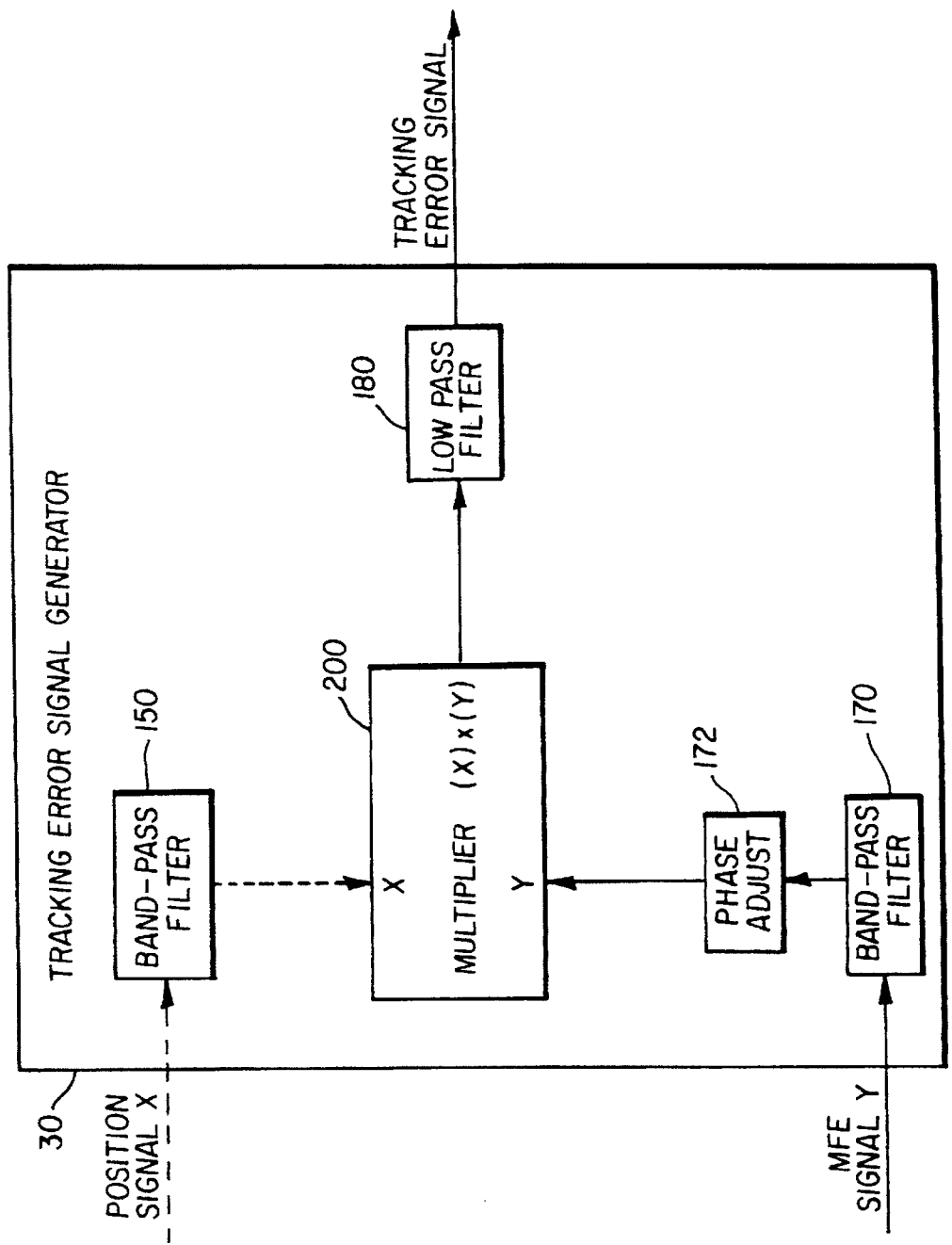
FIG. 10 is a block diagram of another exemplary TES generator in accordance with the present invention.

FIG. 10 shows an alternative TES generator in accordance with the present invention. The position signal X is bandpass filtered in BPF 150. The MFE signal Y is bandpass filtered in BPF 170 and phase adjusted in phase adjust element 172. The signals X and Y are then multiplied together in a multiplier 200 and the result is filtered in low-pass filter 180 to provide a dynamic TES. When the signals X and Y are in phase, corresponding to a groove centerline to the right of the recording spot, the TES will be positive in sign. When the signals X and Y are out of phase, corresponding to a groove centerline to the left of the recording spot, the TES will be negative in sign. The magnitude of the TES will increase as the recording beam moves farther off-track in either direction. When the recording beam is on-track, the TES will be substantially zero. Again, the dynamic TES can be utilized in a conventional tracking servo control system to keep the recording beam on-track. The dynamic TES may be used alone or in conjunction with a push-pull signal or other conventional tracking signal.

Although not shown in FIG. 1, the recording system 10 could include a computer, microprocessor, application-specific integrated circuit (ASIC) or other digital data processor suitable for directing the signal processing operations described above. The system 10 may also include a system memory capable of storing, for example, various measured signal values. Furthermore, it should be noted that the signal processing operations may be completely or partially implemented in software or firmware.

It should be emphasized that the embodiments described above are exemplary only. Many variations may be made in the arrangements shown, including, for example, the type of MFE and position signals used, and the manner in which the MFE and position signals are correlated to provide a dynamic tracking error signal. These and other variations within the scope of the appended claims will be readily apparent to those skilled in the art.

PARTS LIST

| | |
|---|---|
| 10 | optical recording system |
| 11 | optical source |
| 12 | beam-shaping optics |
| 13 | beam splitter |
| 14 | optical recording medium |
| 15 | objective lens |
| 16 | housing |
| 17 | servo control system |
| 18 | beam splitter |
| 19 | detector array |
| 20 | focus detector |
| 21 | optical aperture |
| 22 | focusing lens |
| 23 | MFE signal generator |
| 25 | position signal generator |
| 30 | tracking error signal generator |
| 50 | polycarbonate substrate |
| 52 | incident recording beam |
| 53 | groove |
| 54 | substrate surface |
| 55 | dye recording layer |
| 56 | gold reflective layer |
| 57 | area between grooves |
| 100 | reflected write pulse |
| 105 | integrated area |
| 110 | reflected pulse falling edge |
| 150 | band pass filter |
| 152 | digitizer |
| 154, 156 | switches |
| 160 | inverter |
| 170 | band pass filter |
| 172 | phase adjust element |
| 180, 182 | low pass filters |
| 184 | difference circuit |
| 200 | multiplier |
| A, B, C | beam spot positions |
| CL1 | groove centerline |
| D1, D2 | detector elements |
| d1, d2 | detected signals |
| FA | focus actuator |
| S1 | recording spot |
| TA | tracking actuator |
| TS1, TS2 | tracking structures |
| $T_0$ | reflected pulse rising edge time |
| $\Delta T$ | time interval |
| $\Delta T_1$ | first predetermined time |
| $\Delta T_2$ | second predetermined time |
| $V_1, V_2, V_T, V_{TH}$ | voltage levels |
| $V(t)$ | voltage signal |
| X | position signal |
| $\Delta X$ | position signal variation |
| $Y, Y_{A1}, Y_{C1}$ | MFE signals |
| $\Delta Y_A, \Delta Y_B, \Delta Y_C$ | MFE signal variation |

What is claimed is:

1. An apparatus for use in an optical recording system in which an incident beam records data on a medium in the form of marks, and in which a return beam, corresponding to a reflection of the incident beam from the medium, is detected in an optical detector, the apparatus comprising:

a mark formation signal generator connected to receive a reflected write signal generated from the return beam by the detector and operative to generate from the reflected write signal a mark formation signal derived from at least one reflected write pulse of the reflected write signal, such that the mark formation signal is indicative of a characteristic of the marks formed on said medium by said incident beam;

a position signal generator operative to generate a position signal indicative of a cross-track position of said incident beam on said medium relative to a tracking structure on said medium; and a tracking error signal generator coupled to said mark formation and position signal generators and operative to correlate variations in said mark formation signal with variations in said position signal to thereby provide a tracking error signal.

2. The apparatus of claim 1 wherein said recording medium is an optical disk and said tracking structure corresponds to a wobbled groove on said optical disk.

3. The apparatus of claim 1 wherein said mark formation signal generator samples a given reflected write pulse of the reflected write signal at one or more predetermined times after a rising edge of said given pulse.

4. The apparatus of claim 1 wherein said mark formation signal generator samples a given reflected write pulse of the reflected write signal at one or more predetermined times after a falling edge of said given pulse.

5. The apparatus of claim 1 wherein said mark formation signal generator integrates an area under the reflected write signal during a given reflected write pulse.

6. The apparatus of claim 1 wherein said mark formation signal generator integrates an area under the reflected write signal after a falling edge of a given reflected write pulse.

7. The apparatus of claim 1 wherein said position signal generator is coupled to the detector and wherein said position signal includes an AC component indicative of an instantaneous cross-track position of said incident beam relative to the tracking structure on said medium, and further wherein said tracking error signal generator correlates said variations in said mark formation signal and said AC component of said position signal to provide said tracking error signal.

8. The apparatus of claim 1 wherein said position signal corresponds to a push-pull signal.

9. The apparatus of claim 1 wherein said position signal corresponds to an ATIP wobble signal and said position signal generator generates the position signal from wobbled-groove components of the return beam.

10. The apparatus of claim 1 wherein said position signal generator provides said position signal as an actuator drive signal applied to a tracking actuator of said optical recording system.

11. The apparatus of claim 1 wherein the tracking error signal generator further includes:

a digitizer connected to a position signal input of the tracking error signal generator and adapted to convert said position signal to a digitized position signal;

a switch connected to said digitizer and to a mark formation signal input of said tracking error signal generator and operative to gate said mark formation signal in accordance with a logic level of said digitized position signal; and a difference circuit coupled to said switch and receiving said mark formation signal on a first input when said digitized position signal is at a first logic level, receiving said mark formation signal on a second input when said digitized position signal is at a second logic level, and providing the tracking error signal as a difference between the first and second inputs.

12. The apparatus of claim 11 wherein said tracking error signal generator further includes:

a first band pass filter connected between said position signal input and said digitizer;

a second band pass filter arranged in a signal path of said mark formation signal before said switch; and first and second low pass filters connected between outputs of said switch and the first and second inputs, respectively, of the difference circuit.

13. The apparatus of claim 12 wherein said tracking structure corresponds to a wobbled groove on said medium and further wherein said first and second band pass filters are adapted to pass a range of frequencies including a fundamental wobble frequency of said groove.

14. The apparatus of claim 1 wherein said tracking error signal generator further includes a multiplier circuit having a first input for receiving said position signal, a second input for receiving said mark formation signal, and an output corresponding to said tracking error signal.

15. The apparatus of claim 14 wherein said tracking error signal generator further includes:

a first band pass filter arranged in a signal path of said position signal before said multiplier circuit;

a second band pass filter arranged in a signal path of said mark formation signal before said multiplier circuit; and a low pass filter connected to the output of said multiplier circuit.

16. The apparatus of claim 15 wherein said tracking structure corresponds to a wobbled groove on said medium and further wherein said first and second band pass filters are adapted to pass a range of frequencies including a fundamental wobble frequency of said groove.

17. A method for use in an optical recording system in which an incident beam records data on a medium in the form of marks, the method comprising the steps of:

generating a reflected write signal from a return beam corresponding to a reflection of the incident beam from the medium;

generating from the reflected write signal a mark formation signal derived from at least one reflected write pulse of the reflected write signal, such that the mark formation signal is indicative of a characteristic of the marks formed on said medium by said incident beam;

generating a position signal indicative of a cross-track position of said incident beam on said medium relative to a tracking structure on said medium; and correlating variations in said mark formation signal with variations in said position signal to provide a tracking error signal.

18. The method of claim 17 wherein said recording medium is an optical disk and said tracking structure corresponds to a wobbled groove on said optical disk.

19. The method of claim 17 wherein said position signal includes an AC component indicative of an instantaneous cross-track position of said incident beam relative to the tracking structure on said medium, and further wherein said step of correlating includes correlating said variations in said mark formation signal and said AC component of said position signal to thereby generate said tracking error signal.

20. The method of claim 17 wherein the step of correlating the mark formation and position signals further includes:

digitizing said position signal to provide a digitized position signal;

gating said mark formation signal in accordance with a logic level of said digitized position signal; and generating the tracking error signal as a difference between first and second inputs of a difference circuit, wherein the first input receives said mark formation signal when said digitized position signal is at a first logic level, and the second input receives said mark formation signal when said digitized position signal is at a second logic level.

21. The method of claim 20 wherein said step of correlating said variations in said mark formation and position signals further includes the steps of:

band pass filtering the position signal and the mark formation signal before the steps of digitizing and gating, respectively; and low pass filtering the mark formation signal before the step of generating the tracking error signal as a difference between first and second inputs of the signal difference circuit.

22. The method of claim 17 wherein the step of correlating the variations in said mark formation and position signals further includes the step of multiplying the mark formation and position signals to thereby provide the tracking error signal.

23. The method of claim 22 wherein said step of correlating the mark formation and position signals further includes the steps of:

band pass filtering the mark formation and position signals prior to said step of multiplying said signals; and low pass filtering the result of the multiplying step to thereby provide the tracking error signal.

24. An apparatus for use in an optical recording system in which an incident beam records data on a medium in the form of marks, and in which a reflected return beam is detected in an optical detector, the apparatus comprising:

a mark formation signal generator coupled to the detector and operative to generate from the detected return beam a mark formation signal indicative of a characteristic of the marks formed on said medium by said incident beam;

a position signal generator operative to generate a position signal indicative of a cross-track position of said incident beam on said medium relative to a tracking structure on said medium; and a tracking error signal generator coupled to said mark formation signal generator and said position signal generator and operative to correlate variations in said mark formation signal with variations in said position signal to thereby provide a tracking error signal, wherein the tracking error signal generator further includes:

a digitizer connected to a position signal input of the tracking error signal generator and adapted to convert said position signal to a digitized position signal;

a switch connected to said digitizer and to a mark formation signal input of said tracking error signal generator and operative to gate said mark formation signal in accordance with a logic level of said digitized position signal; and a difference circuit coupled to said switch and receiving said mark formation signal on a first input when said digitized position signal is at a first logic level, receiving said mark formation signal on a second input when said digitized position signal is at a second logic level, and providing the tracking error signal as a difference between the first and second inputs.

25. The apparatus of claim 24 wherein said tracking error signal generator further includes:

a first band pass filter connected between said position signal input and said digitizer;

a second band pass filter arranged in a signal path of said mark formation signal before said switch; and first and second low pass filters connected between outputs of said switch and the first and second inputs, respectively, of the difference circuit.

26. The apparatus of claim 25 wherein said tracking structure corresponds to a wobbled groove on said medium and further wherein said first and second band pass filters are adapted to pass a range of frequencies including a fundamental wobble frequency of said groove.

27. A method for use in an optical recording system in which an incident beam records data on a medium in the form of marks, the method comprising the steps of:

generating a mark formation signal indicative of a characteristic of the marks formed on said medium by said incident beam;

generating a position signal indicative of a cross-track position of said incident beam on said medium relative to a tracking structure on said medium; and correlating variations in said mark formation signal with variations in said position signal to provide a tracking error signal, wherein the step of correlating variations further includes the steps of:

digitizing said position signal to provide a digitized position signal;

gating said mark formation signal in accordance with a logic level of said digitized position signal; and generating the tracking error signal as a difference between first and second inputs of a difference circuit, wherein the first input receives said mark formation signal when said digitized position signal is at a first logic level, and the second input receives said mark formation signal when said digitized position signal is at a second logic level.

28. The method of claim 27 wherein said step of correlating said variations in said mark formation and position signals further includes the steps of:

band pass filtering the position signal and the mark formation signal before the steps of digitizing and gating, respectively; and low pass filtering the mark formation signal before the step of generating the tracking error signal as a difference between first and second inputs of the signal difference circuit.

* * * * *